(12) United States Patent
Demmeler (10) Patent No.: US 9,881,439 B2
(45) Date of Patent: Jan. 30, 2018

(54) CONTAINER AND SYSTEM FOR PROCESSING BANK NOTES

(75) Inventor: Erwin Demmeler, Memmingen (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 126 days.

(21) Appl. No.: 13/497,946

(22) PCT Filed: Sep. 21, 2010

(86) PCT No.: PCT/EP2010/063927
§ 371 (c)(1),
(2), (4) Date: Mar. 23, 2012

(87) PCT Pub. No.: WO2011/036157
PCT Pub. Date: Mar. 31, 2011

(65) Prior Publication Data
US 2012/0175217 A1     Jul. 12, 2012

(30) Foreign Application Priority Data
Sep. 24, 2009 (DE) .................. 10 2009 042 891

(51) Int. Cl.
*G07F 7/04* (2006.01)
*G07D 11/00* (2006.01)
(Continued)

(52) U.S. Cl.
CPC ......... *G07D 11/0006* (2013.01); *B65H 1/027* (2013.01); *B65H 1/30* (2013.01);
(Continued)

(58) Field of Classification Search
CPC .... B65D 11/10; B65D 25/06; G07D 11/0009; G07D 11/0012; G07D 11/0015;
(Continued)

(56) References Cited

U.S. PATENT DOCUMENTS 2,148,681 A * 2/1939 Cameron ............. A01K 41/065
                                                           119/322
3,931,880 A * 1/1976 Ayer ....................... B65H 3/62
                                                           198/382
(Continued)

FOREIGN PATENT DOCUMENTS

CN        101377868 A    3/2009
DE        19512505 A1    10/1996
(Continued)

OTHER PUBLICATIONS

English translation of abstractof DE010347279A1.*
(Continued)

*Primary Examiner* — Jeffrey A Shapiro
(74) *Attorney, Agent, or Firm* — Justin Cassell; Workman Nydegger (57) ABSTRACT

A container and a system for the processing of bank notes which are present as separate units. Beginning with a container for the processing of bank notes which are present as separate units, having a housing, open on one side, for the receiving of bank notes standing on their longitudinal edges, the container can be subdivided by means of separator elements, and the separator elements have free gaps toward the interstices formed therebetween.

22 Claims, 5 Drawing Sheets

(51) Int. Cl.
*B65H 1/02* (2006.01)
*B65H 31/30* (2006.01)
*B65H 1/30* (2006.01)
B65D 25/06 (2006.01)
B65D 6/00 (2006.01)
B65G 47/90 (2006.01)

(52) U.S. Cl.
CPC .......... *B65H 31/3045* (2013.01); *B65D 11/10* (2013.01); *B65D 25/06* (2013.01); *B65G 47/90* (2013.01); *B65H 2301/42242* (2013.01); *B65H 2301/422542* (2013.01); *B65H 2301/4314* (2013.01); *B65H 2405/3312* (2013.01); *B65H 2405/352* (2013.01); *B65H 2553/414* (2013.01); *B65H 2701/1912* (2013.01)

(58) Field of Classification Search
CPC .... G07D 11/00; G07D 11/0006; B65H 1/027; B65H 1/30; B65H 31/3045; B65H 2301/42242; B65H 2301/422542; B65H 2405/352; B65H 2405/3312; B65H 2553/414; B65H 2701/1912; B65H 2301/4314; B65G 47/90; G05D 1/0242; G05D 1/0244; G05D 1/0246; G05B 2219/45083; G05B 2219/37572; G05B 1/0231; G05B 1/0234; G05B 1/0236; G06N 3/008; A61B 19/22; A61B 19/5212; B25J 13/085; B25J 19/023; B25J 9/1697; B25J 9/1692; G01S 5/16; G06K 9/00201
USPC .... 206/561, 563, 564, 804; 294/86.4, 119.1; 220/532, 533, 669–671, 675, 559, 551, 220/529; 414/416.01; 340/686.5; 399/393; 271/42, 129, 145, 149, 264, 271/265.01, 267, 268; 700/245, 253, 700/258; 198/609; 902/13; 312/348.3, 312/348.2; 211/184; D6/491, 510, 511; 194/206, 207; 235/379; 209/534
See application file for complete search history.

(56) References Cited

U.S. PATENT DOCUMENTS

| | | | | |
|---|---|---|---|---|
| 4,083,461 A * | 4/1978 | Wangermann | | 414/792.9 |
| 4,344,727 A * | 8/1982 | Chaloupka | | B65G 57/06 |
| | | | | 198/403 |
| 4,346,813 A * | 8/1982 | Cho | | B65D 25/04 |
| | | | | 220/532 |
| 4,628,827 A * | 12/1986 | Litter | | 109/50 |
| 4,972,625 A * | 11/1990 | Barnes | | A01K 97/06 |
| | | | | 206/315.11 |
| 5,148,591 A * | 9/1992 | Pryor | | 29/407.04 |
| 5,188,062 A * | 2/1993 | Joy | | A01K 1/0117 |
| | | | | 119/164 |
| 5,339,979 A * | 8/1994 | Box | | 220/529 |
| 5,803,446 A | 9/1998 | Leuthold et al. | | |
| 6,065,672 A * | 5/2000 | Haycock | | G07D 11/0009 |
| | | | | 235/379 |
| 6,188,323 B1 * | 2/2001 | Rosenquist et al. | | 340/686.5 |
| 6,234,471 B1 * | 5/2001 | Tranquilla | | B65H 31/40 |
| | | | | 271/149 |
| 6,398,107 B1 * | 6/2002 | Neri | | B65H 31/3054 |
| | | | | 235/379 |
| 6,735,093 B2 * | 5/2004 | Mu-Tsai | | G06F 1/183 |
| | | | | 174/377 |
| 6,991,307 B2 * | 1/2006 | Hoenig | | A47B 88/20 |
| | | | | 211/184 |
| 9,514,593 B2 * | 12/2016 | Dopfer | | B65H 31/3045 |
| 2002/0171344 A1 * | 11/2002 | Hollenstein | | A47B 88/20 |
| | | | | 312/348.3 |
| 2003/0137227 A1 * | 7/2003 | Hoenig | | A47B 88/20 |
| | | | | 312/348.3 |
| 2004/0067127 A1 | 4/2004 | Hofmeister et al. | | |
| 2004/0172730 A1 * | 9/2004 | Washington | | G06Q 20/1085 |
| | | | | 726/6 |
| 2004/0225409 A1 * | 11/2004 | Duncan | | G07F 11/60 |
| | | | | 700/236 |
| 2006/0124500 A1 * | 6/2006 | Mena | | B65D 5/48046 |
| | | | | 206/521 |
| 2006/0167587 A1 * | 7/2006 | Read | | B23Q 9/00 |
| | | | | 700/245 |
| 2007/0278064 A1 * | 12/2007 | Hallowell | | B65B 27/08 |
| | | | | 194/206 |
| 2008/0000796 A1 * | 1/2008 | Lee | | B65D 11/1806 |
| | | | | 206/521 |
| 2008/0142398 A1 * | 6/2008 | Carrigan | | B65B 5/105 |
| | | | | 206/499 |
| 2010/0187748 A1 | 7/2010 | Monch et al. | | |
| 2011/0036731 A1 * | 2/2011 | Bortz | | G07D 11/0006 |
| | | | | 206/1.5 |

FOREIGN PATENT DOCUMENTS

| | | | | |
|---|---|---|---|---|
| DE | 10133235 A1 | | 1/2003 | |
| DE | 010347279 A1 * | | 5/2005 | ............ B65D 11/10 |
| DE | 102007043130 A1 | | 3/2009 | |
| EP | 0143663 A2 | | 6/1985 | |
| EP | 0955259 A1 | | 11/1999 | |
| WO | 0152196 A1 | | 7/2001 | |
| WO | 2009086583 A1 | | 7/2009 | |

OTHER PUBLICATIONS

International Search Report in PCT/EP2010/063927, dated Dec. 28, 2010.
Search Report of German PTO regarding DE 10 2009 9 042 891.7, dated Aug. 25, 2010.
Chinese Examination Report from Chinese Application No. 2014042301353020, dated Apr. 28, 2014.

* cited by examiner

CONTAINER AND SYSTEM FOR PROCESSING BANK NOTES

A. BACKGROUND FIELD

The present invention relates to a container and a system for the processing of bank notes which are present as separate units.

B. RELATED ART

Containers and systems for the processing of bank notes which are present as separate units are known. Separate units here are understood to mean a quantity of at least one bank note or more which is assigned to a certain person, an account, an accounting unit etc. Moreover, the units may also comprise, besides bank notes, checks, vouchers or other documents of value. For example, the separate units may also be formed of separate payments (deposits). Here, the separate payments are prepared, before the processing with a bank note processing machine, for the upcoming processing and filled into containers. For this, in particular data or information of the payment are captured and made available for the processing of the bank note processing machine. The data here may comprise specifications about the payer, an account number, the quantity and the value of the bank notes forming the payment etc. In order to make possible an interruption-free processing by the bank note processing machine, the payments are separated from each other by separator cards which are inserted between various payments. The bank note processing machine recognizes these separator cards upon the processing and thus also the beginning of a new payment.

A payment may consist of several sub-units (sub-deposits). A sub-unit may contain, for example, the day's takings of an individual cash register in a branch store or of an individual bank counter in a branch bank. Such sub-units are normally compiled by a cashier unequivocally in charge and are separated from each other for example through bands. The bands here are normally provided with information identifying the person in charge of the compilation, e.g. through a special stamp and/or a signature. The band is often also provided with information about the payer, i.e. the name of the chain of stores or of the bank.

The separation of sub-units with the help of bands is often used upon the compilation of bank notes having a predefined number of bank notes of a certain denomination, e.g. a bundle of 100 bank notes of 100 Euro each, and thus a fixed total value.

A further possibility for separating sub-units is the use of sealed bags, e.g. safebags or closed envelopes, which are also provided with information about the payer and the person in charge of the compilation.

For facilitating the further processing, the sub-units of a chain of stores or of a bank are packed to form one payment in a transport container which together with a delivery document stating the value of the payment is transferred to a money processing center. The money processing center checks whether the payment contains the value stated on the delivery document and prompts a corresponding credit to the account of the payer. If upon this check there is determined any deviation or recognized a forged bank note, the person in charge of the compilation of the sub-unit must be ascertained, in order to make this person liable for the deviation, if necessary, or to interrogate him as a witness for accepting a forgery. For this, it is necessary to keep all information about a sub-unit until the positive termination of the check and to not mix the associated bank notes with other bank notes, as long as their value is not clearly determined and accounted. Here, the separation and identification of the sub-units may also be effected with separator cards which are inserted between various sub-units.

For improving the continuity of the processing of payments or of the bank notes forming the payments, there are employed, e.g. as described in DE 195 12 505 A1, containers, so-called carriers, into which the bank notes of the various payments as well as the separator cards separating the payments are inserted, so as to feed them to the bank note processing machine. In this case, the carriers, one after the other, are brought in the area of a singler of the bank note processing machine by a transport device and are individually removed from the carrier by the singler for the processing in the bank note processing machine.

It has, however, turned out upon the processing of bank notes by means of the known apparatuses and methods for the processing of bank notes which are present as separate units, that the employed carriers are elaborate and expensive to manufacture. In addition, it is only to a limited extent possible to prepare the employed carriers in advance and to then hold them ready in a larger number for the processing, because for example they can hardly be stacked so that the space-saving handling of a larger number of carriers is not possible.

SUMMARY OF THE DISCLOSURE

It is therefore the object of the present invention to state a container and a system for the processing of bank notes which are present as separate units, which container and system make possible an almost entirely continuous processing of a large number of units through the large number of units being able to be prepared arbitrarily before the actual processing. For this purpose, in particular a suitable container for the receiving of the units is to be stated, which allows an almost entirely automatic processing of a large number of units and thus bank notes. The container is moreover to be realizable cost-effectively, allow a good ergonomic handling and be capable of reliable processing even when only partially filled with bank notes.

Here, one starts out from a container for the processing of bank notes which in particular are present as separate units, having a housing, open on one side, for the receiving of bank notes standing on their longitudinal edges, whereby the container can be subdivided by means of separator elements, and the separator elements have free gaps toward the interstices formed therebetween.

The advantage of the invention is to be seen in particular in the fact that bank notes kept in the interstices of the container can be gripped and removed from the container via the free gaps.

In a development, container and separator elements have devices for ascertaining the position of each separator element within the container and the presence of bank notes in the container. Advantageously, the devices are formed of reflecting material and non-reflecting material. Here, reflecting material is attached to the interior surface of the bottom of the container, over substantially the entire length of the interior surface of the bottom of the container. Moreover, the separator elements have non-reflecting material in at least one free gap in the area of the reflecting material of the container, as well as reflecting material in at least one free gap in the area outside the reflecting material of the container.

The devices for ascertaining the position of each separator element within the container and the presence of bank notes allow the largely automatic processing of the containers, because they make it possible to localize the separator elements within the container and to determine whether bank notes are contained in interstices.

In the system for the processing of bank notes which in particular are present as separate units there is employed at least one container according to the invention, which is emptied by means of a gripper for the removal of bank notes received in the container, whereby the gripper has comb-like structures which mesh with the free gaps of the separator elements, which gaps point toward the interstices.

By means of the gripper matched to the container and its separator elements there is possible a simple and reliable removal of the bank notes kept in the container.

In a development of the system it is provided that the gripper has sensors for the positioning of the gripper over the separator elements, which sensors detect the devices for ascertaining the position of each separator element, in particular through the emission of light beams and the detection of reflected light.

The sensors for the positioning allow the gripper to work completely independently and to remove the bank notes from the container. This makes possible an almost complete automation of the processing of the bank notes.

In a further improvement of the system there is provided a transport system for the transport of the containers filled with bank notes to the gripper and for the transport of the emptied containers away from the gripper.

The improved system makes possible the processing of large quantities of bank notes, whereby the bank notes, for the processing, can be prepared and filled into the containers in advance. The actual processing by means of a bank note processing machine can then be effected entirely without the intervention of an operator.

The system can be built particularly space-saving, when the transport system intersects the bank note processing machine in the base area.

DESCRIPTION OF THE DRAWINGS

Further advantages of the present invention appear from the dependent claims as well as the following description of embodiments with reference to Figures.

Figure 1:
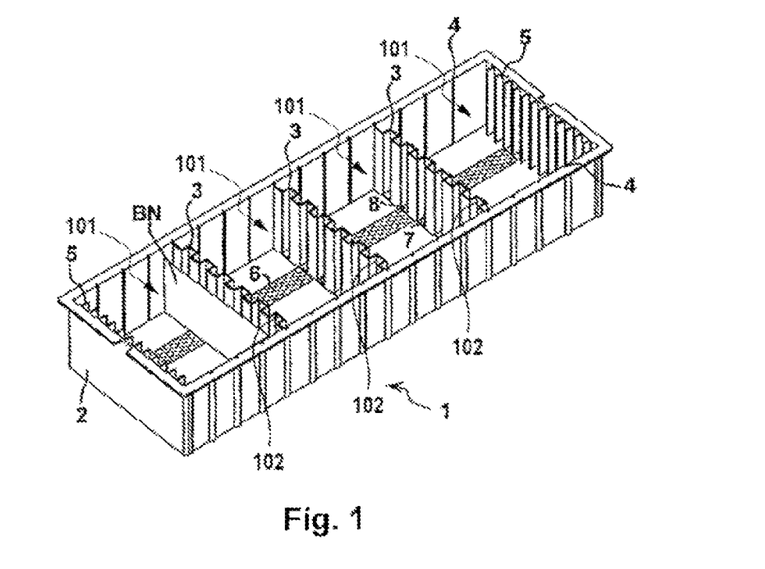
FIG. 1 shows a container for the processing of bank notes which are present as separate units.

FIG. 1 shows a container 1 for the processing of bank notes which are present as separate units.

DETAILED DESCRIPTION OF PREFERRED EMBODIMENTS OF THE INVENTION

The container 1 can be subdivided by means of separator elements 3. The separator elements 3 have free gaps 102 toward the interstices 101 formed therebetween. The container 1 is formed of a housing 2 closed on five sides, which has several subdivisions 4 which can receive separator elements 3 in an interchangeable fashion. The subdivisions 4 may have defined distances to each other. It can also be provided that separator elements 3 are fixed with specified distances are attached in the container 1. Between the separator elements 3 there can be input bank notes BN. The bank notes BN here are input such that they are kept standing on their longitudinal edges in the container 1. This makes it possible that the bank notes BN can be grasped upon input at their longitudinal edges, thereby making possible a reliable and ergonomically favorable filling of the container.

Figure 2:
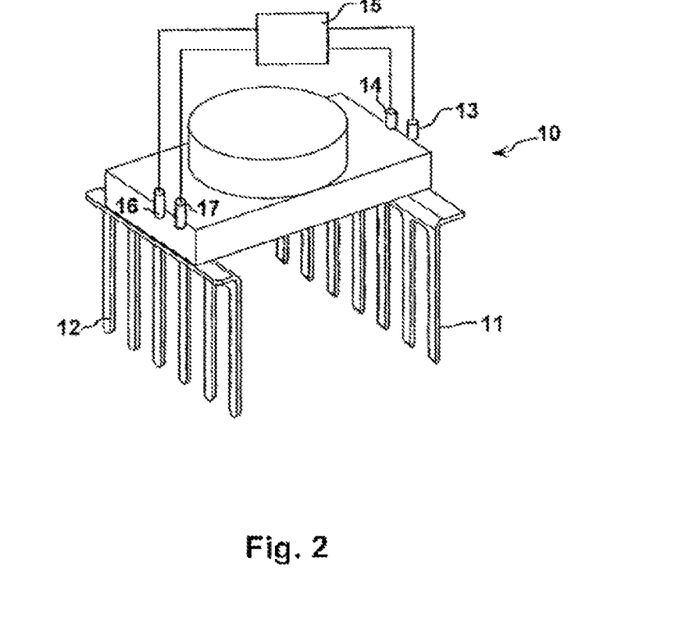
FIG. 2 shows a gripper suitable for the container represented in FIG. 1.

FIG. 2 shows a gripper 10 suitable for the container 1 represented in FIG. 1. The gripper 10 has rake-like elements 11 and 12 which can be moved toward each other and away from each other. In order to reliably grip bank notes located in the container, it is advantageous to configure the rake-like elements 11, 12 such that they extend over substantially the entire inside width of the container 1. Moreover, the gripper 10 has sensors 13, 14, 16, 17 for positioning the gripper 10, whose signals are evaluated by a control device 15 controlling the gripper.

The separator elements 3 within the container 1 are necessary so that the gripper 10 can pass in defined fashion between bank notes located in the container 1 and grip bundles of bank notes and remove them from the container 1 in defined fashion. The separator elements 3 here can also be employed for the delimitation of the above-described individual units of bank notes, such as e.g. payments.

For the gripper 10 there can be specified a maximum grip range, so that it can reliably grip the bank notes. This maximum grip range can be for example 100 to 140 mm. In this case it is advantageous to employ the above-described fixed separator elements 3, whereby the specified distances of the separator elements 3 within the container 1 are determined by the maximum grip range.

The separator elements 3 must make possible a passing of the gripper fingers of the rake-like elements 11 and 12 in the container 1, whereby it must also be possible that bank notes directly adjoining the separator elements 3 can be reliably grasped and held by the gripper 3.

By way of example, the separator elements 3 are formed meanderingly, altogether it is to be taken into account here that the separator elements 3 claim as little space as possible within the container 1, so that it is possible to receive a number of bank notes as large as possible. Of course, the gripper fingers of the gripper 10 must be configured corresponding to the separator elements 3. Separator elements 3 of the same kind can also be arranged at the end and beginning of the container 1, but it is also possible to provide a comb-like structure 5 at the end and beginning of the container 1, which can also make possible the passing of the gripper fingers of the rake-like elements 11 and 12 in the container 1.

If the separator elements 3 are also employed, as described before, for separating individual units of bank notes, with units consisting of only a few bank notes there may arise the problem that the interstice between two fixed separator elements 3 is filled only incompletely. In order to make it possible that the bank notes BN can be kept, also in this case, in a defined fashion standing on their longitudinal edges in the container, the employment of additional separator elements is required, which can be variably inserted with relatively small distances to each other or to the present fixed separator elements 3. For this purpose, the above-described subdivisions 4 can be employed. A suitable grid spacing may be approximately 25 to 35 mm. In general, the grid spacing depends on the bank notes to be processed, i.e. the width of the smallest bank note, and should not be larger than half the smallest width. Thus, also very few bank notes can be kept, as provided, standing on their longitudinal edge in the container 1. It can thus be avoided that the bank notes fall over and lie flat on the bottom of the container 1. Instead of employing a specified grid spacing for the subdivisions 4 or fixed separator elements 3, it can also be provided that the separator elements 3 can be arranged with arbitrary distances to each other. For this purpose, the separator elements can be formed for example telescopically and be subjected to a spring force, so that the separator elements can be clamped at an arbitrary place between the outer walls of the container.

Of course, also the above-mentioned separator cards can be employed for the separation of different units of bank notes. In this case, several units of bank notes can be input between two separator elements 3. Likewise, units consisting of a particularly large number of bank notes can also be split up into more than one interstice.

For reliably positioning the gripper 10 for the removal of bank notes from the container 1, there are employed the above-mentioned sensors 13, 14, 16, 17, in order to ascertain the positions of the separator elements 3 within the container. Under certain circumstances, these sensors may also be omitted, if only separator elements 3 with firmly specified distances are employed. In this case, the gripper 10 can be moved by the control device to the known positions of the separator elements 3. The sensors 13, 14, 16, 17 of the gripper 10 can be formed for example by light scanners which emit a light beam and detect whether light beam is reflected.

Figure 3:
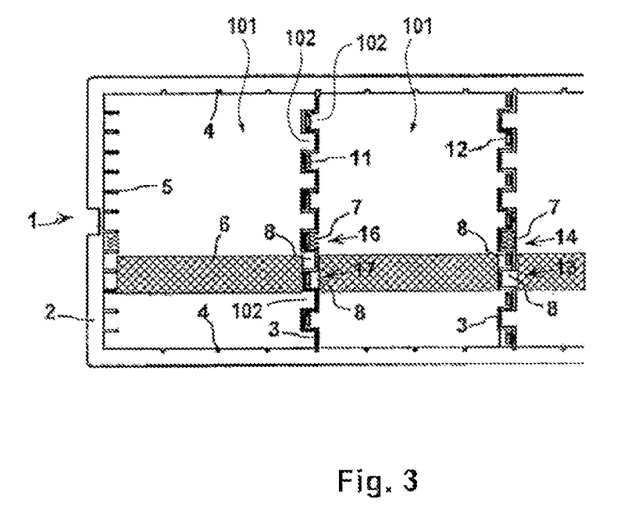
FIG. 3 shows a detail of the container represented in FIG. 1.

As it can be seen in the FIGS. 1 and 3, in the container 1 there is arranged a reflecting area 6 on the container bottom, which extends over the longitudinal direction of the container 1. In at least one of the free gaps 102 of the separator elements 3, there is arranged outside the reflecting area 6 on the container bottom a reflecting area 7. In at least one other of the free gaps 102 of the separator elements 3 there is arranged a non-reflecting area 8 within the reflecting area 6 on the container bottom. The reflecting areas 6 and 7 can be formed for example by reflector foils. The non-reflecting area 8 can be for example a matt surface.

Upon a movement of the gripper 10 in the longitudinal direction over the container 1, the first sensors 13, 17 arranged in the reflecting area 6 on the container bottom detect whether the reflecting area 6 on the container bottom is covered or free. If the container bottom is free, the emitted light beam is reflected. If the container bottom is not free, the emitted light beam is not reflected. This may indicate that bank notes are located in the container, or that a separator element 3 is present whose non-reflecting area 8 covers the reflecting area 6 on the container bottom. At the same time, the second sensors 14, 16 detect the emitted light beam only upon the presence of separator elements 3 or the reflecting areas 7 thereof. Upon the evaluation of the signals of the sensors 13, 14, 16, 17 by the control device 15, thus, the presence of bank notes can be concluded, if neither the first sensors 13, 17 nor the second sensors 14, 16 detect any light reflection. If only the second sensors 14, 16 detect a light reflection, but the first sensors 13, 17 not, a separator element 3 is present. Finally, an empty interstice can be concluded, if only the first sensors 13, 17 detect a light reflection, but the second sensors 14, 16 not. Therefore, the control device can ascertain the position of the separator elements 3 and position the gripper 10 accordingly for the removal of bank notes from the container 1.

Since the gripper is moved longitudinally over the container, one of the sensor pairs 13, 14 or 16, 17 can be omitted. In this case, the sensor pair lying in front, in the moving direction of the gripper 10, is employed.

For a simple and ergonomic handling, the container 1 should be cost-effective and as light as possible. A manufacturing from plastic material, in particular injection molding, is advantageous. Corresponding design features, e.g. the represented edges, can facilitate the handling, because the container 1 can be easily gripped at the edges. In addition, there can be provided a lid for the container 1 so that the opening of the container can be covered. The lid may also be lockable.

Figure 4:
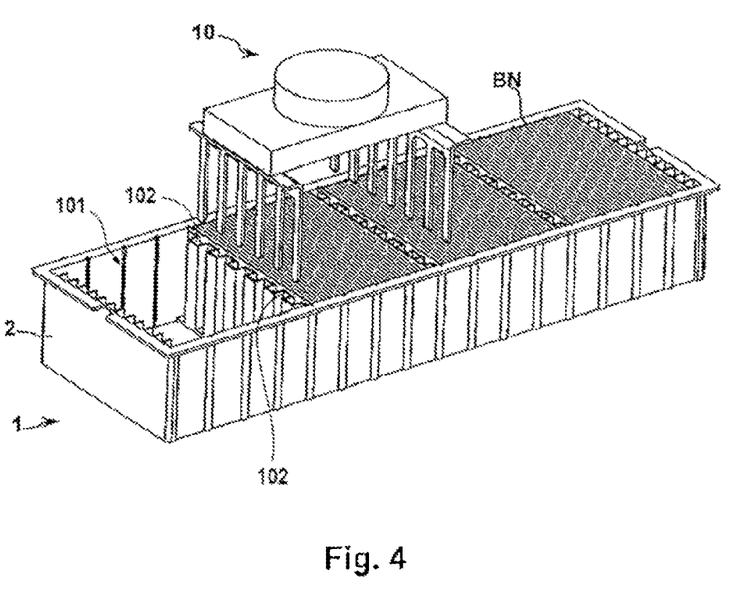
FIG. 4 shows the container, represented in FIG. 1, partially filled with bank notes together with the gripper of FIG. 2.

FIG. 4 shows a container 1 partially filled with bank notes, together with gripper 10. In FIGS. 5a to 5d there is shown the removal of bank notes from the container 1, represented in FIG. 4, by means of the gripper 10.

Figure 5A:
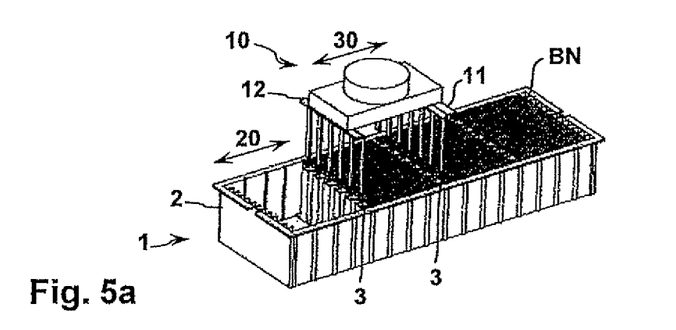
FIG. 5 shows several steps for removing bank notes from the container represented in FIG. 4 by means of the gripper.

As represented in FIG. 5a, the gripper 10 is guided, coming from the left, over the container 1. As described above, the control device 15 ascertains from the signals of the sensors 13, 14 and/or 16, 17 the presence of bank notes BN as well as the positions of separator elements 3 and positions the gripper 10. Since the first interstice, when viewed from the left, contains no bank notes, the gripper 10 is moved along its travel path 20 until the bank notes in the second interstice are detected and the positions of the separator elements 3 enclosing the second interstice are ascertained. Subsequently or at the same time, the gripper 10 moves 30 the rake-like elements 11 and 12 to the positions determined for the separator elements 3.

Figure 5B:
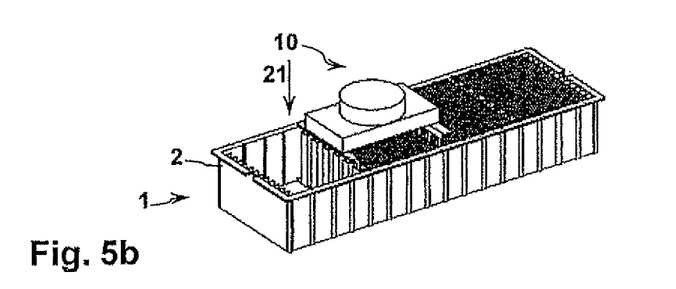

As represented in FIG. 5b, the gripper 10 is subsequently lowered 21 into the container 1, so that it can grip the bank notes located in the interstice. The rake-like elements 11 and 12 of the gripper 10 here mesh with the gaps of the separator elements 3 which are open toward the interstice located between the separator elements 3 (FIG. 3).

Figure 5C:
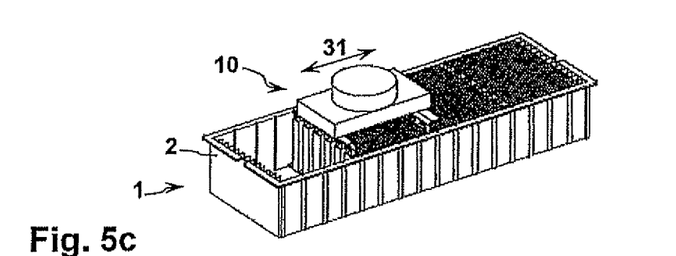

As represented in FIG. 5c, the rake-like elements 11 and 12 of the gripper 10 are then moved toward each other 31 so as to clamp the bank notes located in the interstice and to thus grasp them.

Figure 5D:
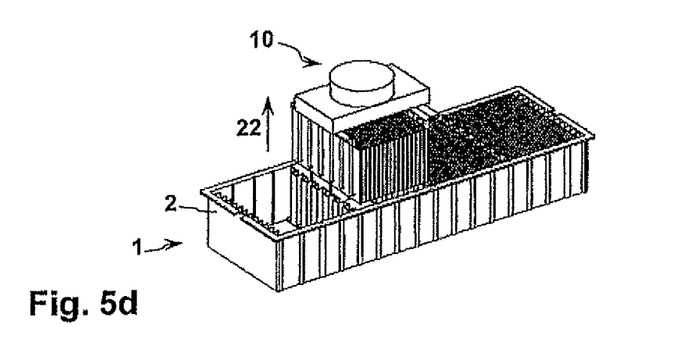

As represented in FIG. 5d, the bank notes clamped between the rake-like elements 11 and 12 of the gripper 10 are then removed from the container 1 by the gripper 10.

The bank notes removed from the container 1 by the gripper 10 are then fed to a processing, for example by means of a bank note processing machine. For this purpose, the bank notes are inserted by gripper 10 into a singler of the bank note processing machine. Such a bank note processing machine as well as the associated singler are described for example in the above-mentioned DE 195 12 505 A1 or DE 10 2007 043 130 A1. It is obvious that the gripper 10 must be arranged in the area of the singler of the bank note processing machine so as to be able to insert the bank notes removed from the container 1 into an input pocket of the singler. It is also obvious that in the area of the gripper 10 there must be provided a suitable receiving means for one or several containers 1, so that an operator can feed the containers 1 filled with bank notes to the receiving means for the processing of the bank notes. An exemplary implementation of the arrangement of a gripper 10 in the area of the singler as well as of a receiving means can be inferred from FIG. 6 with associated description, in which an automated feed of containers 1 to a bank note processing machine is represented and described.

Figure 6A:
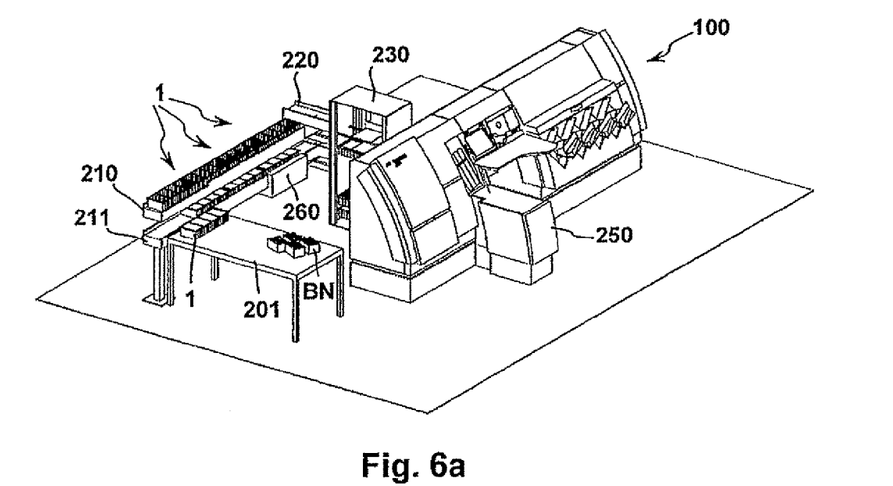
FIG. 6 shows various views of a system for processing bank notes.
Figure 6B:
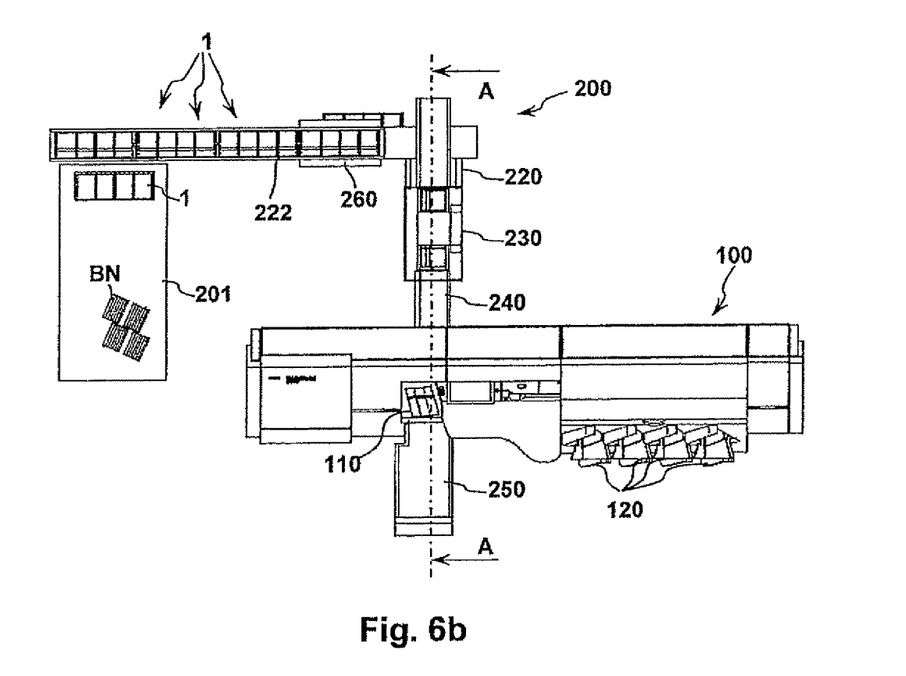
Figure 6C:
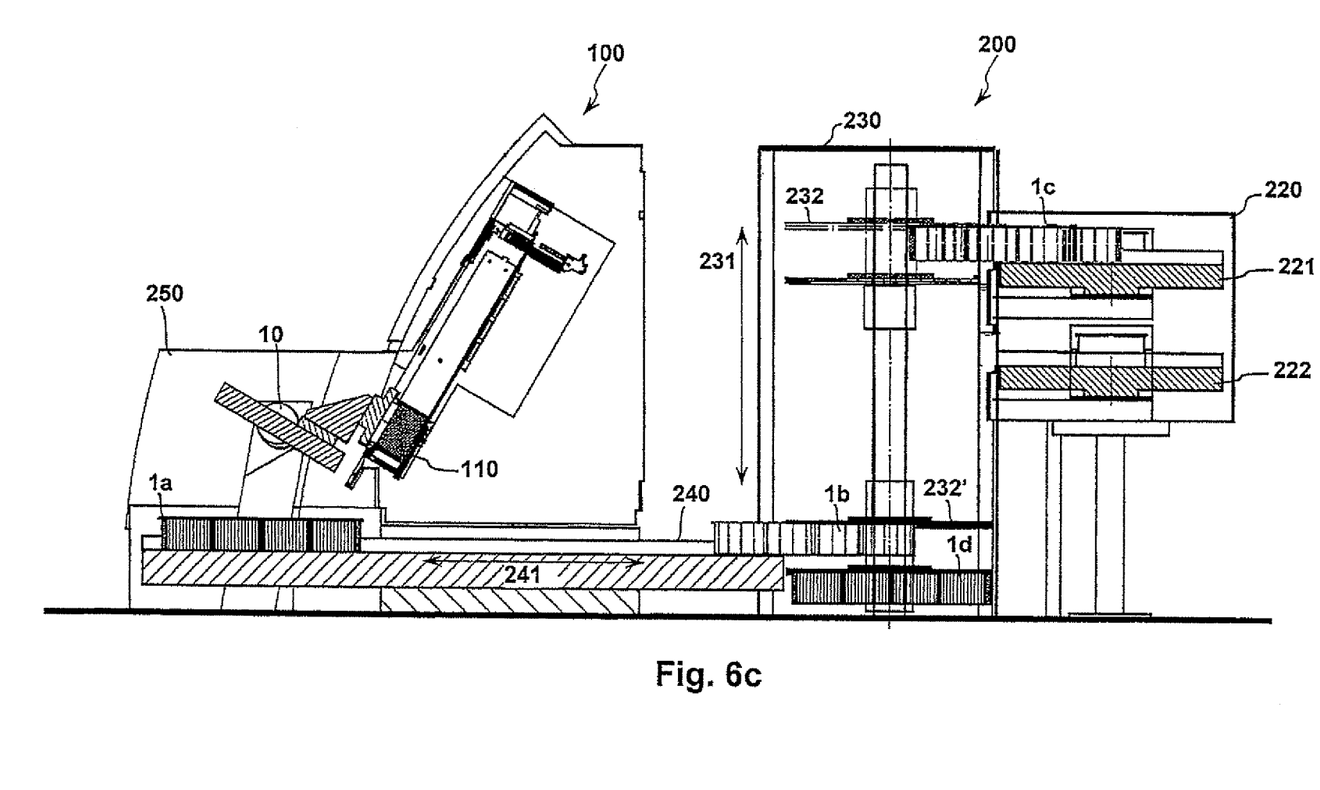

In the FIGS. 6a, 6b and 6c there is represented a system for processing bank notes from different views. FIG. 6a shows a spatial view of the system. FIG. 6b shows a view of the system from the top. FIG. 6c shows a section through the system along a line AA according to FIG. 6b.

The system has, in the represented exemplary embodiment, at least one container 1, a bank note processing machine 100 and a transport system 200 for feeding the one or more containers 1 to the bank note processing machine 100.

For preparing the processing of bank notes BN, which can be present for example as separate units, there is employed for example a work surface 201, e.g. a table. The bank notes BN or the separate units are input, as described above, by an operator in one or several interstices in one or several containers 1 in such a way that the bank notes stand on one of their longitudinal edges.

Upon the filling of the containers 1 by the operator, it may be provided that the operator captures information characterizing the units and makes it available for the further processing by the bank note processing machine 100. For example, the above-mentioned information items such as the name of the payer, account number, etc. can be captured for each unit and made available. Capturing the information can be effected by means of suitable reading devices, e.g. a barcode reader can be employed, if the information is present in a correspondingly coded form. The information, however, can also be input by the operator, e.g. by means of a keyboard or a touchscreen. The such captured information is assigned to the respective container 1. For this, the containers may have for example a unique identification To this unique identification there is then assigned the captured information about the bank notes or units of bank notes located in the respective container 1. For example, there may also be included information as to in which of the interstices of the respective container there are located one or several certain units. The captured information as well as the unique identification of the respective container 1 can be transmitted to a control device of the bank note processing machine 100 and be stored there, so that the bank note processing machine 100 can effect, upon the later processing of the bank notes forming the units, an accounting for the units. Alternatively or additionally, the captured information can be stored in a memory which is connected with the respective container 1. The memory can be realized for example through RFID technology, so that, upon the preparation by the operator, the information is written contactlessly into the memory and, upon the processing in the bank note processing machine 100, can be contactlessly read out from the memory. Further information for the processing of the bank notes or units can be made available by employing the above-described separator cards.

The containers 1 filled with bank notes or units are fed to a first transport path 211 of the transport system 200 by the operator. It is also possible, however, that the prepared containers 1, prior to a processing, are temporarily stored and stacked at an arbitrary place or are stored in lockable containers.

In the transport system 200, e.g. in the area of the first transport path 211, there can be arranged a jogging station 260 which generates vibrations for example by means of unbalance motors. These vibrations act upon the transported containers 1 in order to align the bank notes located therein. In particular in the multi-denomination mode with differently broad denominations it can often be observed that individual bank notes, in particular the bank notes of narrow denominations, are not sufficiently aligned, i.e. do not rest with one of their longitudinal edges on the bottom of the container 1. After the singling, this can lead to a faulty transport of the individual bank notes. This causes for example problems upon the processing in the bank note processing machine. By jogging the containers in the jogging station 260 it can be achieved that also narrower bank notes touch with one of their longitudinal edges the bottom of the containers 1. If the container 1 is held obliquely in the jogging station 260, there can additionally be effected an alignment with a short edge of the bank notes.

The first transport path 211 transports the containers 1 to a second transport path 220 which rotates the containers 1 by 90° by means of a rotation device 222 and transfers them to a third transport path 230. In a different, linear arrangement of the transport system, of course, the second transport path 220 may be omitted.

The third transport path 230 can receive several containers 1 and thus additionally serve as an intermediate storage for containers 1d filled with bank notes. The third transport path 230 has an elevator system 232 with which the containers can be vertically 231 moved. For illustration, the elevator system 232 is additionally represented in a second position 232' in FIG. 6c. The containers 1 with bank notes coming from the first transport path 211 and rotated by the rotation device 222 of the second transport path 220 are transferred by the elevator system 232 of the third transport path 230 to a fourth transport path 240.

The fourth transport path 240 transports 241 the container 1a into the area of the gripper 10 which is accommodated in a housing 250 adjacent to the bank note processing machine 100 and its singler 110. Preferably, the fourth transport path 240 intersects the bank note processing machine 100 in the base area. This renders the structure of the overall system particularly efficient. In the area of the gripper 10 there can also be arranged a reading device which reads the unique identification of the container 1a, so as to make available the information about the units assigned to the container 1a for the processing of the units. If the containers 1 have the above-described memory, the reading device is suitable to read the stored information from the memory.

The gripper 10 removes bank notes from the container 1a and inserts these into the input pocket of the singler 110. Subsequently, the bank notes are processed and accounted in the bank note processing machine 100 using said information. The processed bank notes are placed in output pockets 120 of the bank note processing machine 100.

After the gripper 10 has removed all bank notes from the container 1a, the empty container 1a is transported 241 from the fourth transport path 240 to the third transport path 230. There, the empty container 1b is vertically transported 231 by the elevator system 232' (represented in the second position). When the elevator system 232 has reached the represented first position, the empty container 1c is transferred to a rotation device 221 of the second transport path 220 and transferred, rotated by 90°, to a fifth transport path 210. The fifth transport path 210 transports the empty container 1 into the area of the work surface 201. Therefore, the empty container 1 is available to the operator for a re-filling with bank notes.

As described above, the third transport path 230 can receive several containers 1 and thus additionally serve as an intermediate storage for containers 1d filled with bank notes. This can be particularly advantageously implemented, when the elevator system 232 has two or more receiving means for containers 1. This can be inferred from the second position of the elevator system 232' represented in FIG. 6c. There, the empty container 1b is taken over by the first receiving means of the elevator system 232', while in the second receiving means of the elevator system 232' there is located a filled container 1d. To speed up the processing, the filled container 1d is transferred, after the empty container 1b is received by the first receiving means of the elevator system 232', to the fourth transport path 240. Thereafter, the empty container 1b is transported, as described above, to the fifth transport path 210 so as to there again being available to the operator. Then a new filled container can be taken over by the second receiving means and again be brought by the elevator system 232' into the second position represented in FIG. 6c.

Through the automatic alternation of the containers and their emptying by the gripper, the system holds ready a large buffer of units or bank notes to be processed, which can be processed without any manual intervention.

A further automation can be achieved, when also for the filling of the containers 1 there is used a gripper in the area of the work surface 201, or when the work surface 201 is supplemented or replaced by a correspondingly automated input.

The hitherto described containers 1 are suitable to receive bank notes in a row. It is obvious that there can also be employed containers, into which the bank notes can be input in the described way in several rows side by side.

The invention claimed is:

1. A system for the processing of bank notes, the bank notes being arranged as separate units, the system comprising:
   at least one container configured to hold the bank notes, the container including
      a housing open on one side, the housing including a first set of outer walls extending parallelly in a length direction of the housing and a second set of outer walls extending parallelly in a width direction of the housing, the length direction being perpendicular to the width direction, a first outer wall of the second set of outer walls being arranged at a first end of the first set of outer walls and a second outer wall of the second set of outer walls being arranged at a second end of the first set of outer walls, the housing being arranged to receive bank notes standing on their longitudinal edges with the second set of outer walls arranged parallel to planes of the bank notes;
   wherein separator elements subdivide the container in the length direction into a plurality of interstices, the separator elements defining the interstices in the length direction by the separator elements extending in the width direction from a first outer wall of the first set of outer walls to a second outer wall of the first set of outer walls, the width of the separator element corresponding to a widest width of the bank notes to be processed,
   wherein each of the separator elements has a meandering form that defines free gaps,
   wherein, for each of the separator elements, the free gaps include first free gaps disposed opening toward a first adjacent interstice and second free gaps disposed opening toward a second adjacent interstice,
   wherein, for each of the separator elements, the first free gaps are interspersed between the second free gaps in the width direction along the separator element; and
   a gripper arranged to remove bank notes received in the container, said gripper having at least one pair of rake-like structures which mesh within the free gaps of the separator elements.

2. The system according to claim 1, wherein the gripper comprises sensors that position the gripper over the separator elements, said sensors detecting the devices to ascertain the position of each separator element of the container.

3. The system according to claim 2, wherein the sensors emit a light beam and detect reflected light.

4. The system according to claim 1, comprising a bank note processing machine with a singler,
   wherein the gripper is arranged to insert bank notes removed from the container into an input pocket of the singler.

5. The system according to claim 4, comprising a transport system that transports containers filled with bank notes to the gripper and move the containers, after the emptying by the gripper, away from the gripper.

6. The system according to claim 5, wherein the transport system intersects the bank note processing machine in the base area.

7. The system according to claim 5, wherein the transport system includes a jogging station that effects jogging of the containers filled with bank notes, so that all bank notes in the container rest with one of their longitudinal edges on the bottom of the container.

8. The system according to claim 7, wherein the jogging station effects an alignment of the bank notes along one of their short edges.

9. The system according to claim 1, further comprising a jogging unit configured to generate vibrations that act on the container,
   wherein the container is configured that upon vibration of the container by the jogging unit, the bottom longitudinal edges of the bank notes are aligned.

10. The system according to claim 9, wherein the container is further configured that upon vibration of the container, side edges of the bank notes are aligned at least along one side of the container.

11. The system according to claim 1, wherein at least one of the separator elements is subjected to a spring force such that the separator element is clamped at un-predetermined location based on a thickness of a unit of bank notes in the length direction to be confined within an interstice adjacent to said separator element.

12. The system according to claim 1, wherein
   the system comprises a plurality of containers, and each of the containers has a unique identification, and
   for each of the containers, captured information about the bank notes contained by the container is assigned to the unique identification of the container.

13. The system according to claim 1, wherein the container includes subdivisions that receive the separator elements.

14. The system according to claim 1, wherein the container and the separator elements comprise devices that ascertain the position of each separator element within the container and the presence of bank notes in the container.

15. The system according to claim 14, wherein the devices for ascertaining the position of each separator element within the container and the presence of bank notes in the container comprise reflecting material and non-reflecting material,
   wherein said reflecting material located on the interior surface of the bottom of the container extends over substantially the entire length of the interior surface of the bottom of the container, and the separator elements comprise said non-reflecting material in at least one free gap in the area of the reflecting material of the container as well as said reflecting material in at least one free gap in the area outside the reflecting material of the container.

16. The system according to claim 1, wherein the container comprises said comb-like structures on walls extending parallel to the separator elements, said structures having free gaps located toward an interstice formed with a next adjacent separator element.

17. The system according to claim 1, wherein at least one of the container and separator element comprise injection molded plastic material.

18. The system according to claim 1, wherein, for each of the separator elements, the first interstice is on a first side of the separator element and the second interstice is on a second side of the separator element.

19. The system according to claim 18, wherein the first side of the separator element is opposite from the second side of the separator element.

20. The system according to claim 1, wherein each of the rake-like structures has a width that corresponds substantially to the entire inside width of the container.

21. The system according to claim 1, wherein an applied spring force applied to at least one of said separator elements can variably be positioned at a non-predetermined place along the length direction of the housing to accommodate units of bank notes of varying thicknesses in the length direction of the housing within a corresponding interstice adjacent to the at least one of said separator elements.

22. The system according to claim 1, the at least one of said separator elements is formed telescopically in a width direction of the housing.

* * * * *